United States Patent [19]

Nozaki

[11] 3,856,856

[45] Dec. 24, 1974

[54] PRODUCTION OF CARBOXYLIC ACIDS AND ESTERS
[75] Inventor: Kenzie Nozaki, St. Louis, Mo.
[73] Assignee: Shell Oil Company, Houston, Tex.
[22] Filed: Jan. 8, 1973
[21] Appl. No.: 321,896

[52] U.S. Cl........... 260/532, 260/410.9 R, 260/413, 260/488 K
[51] Int. Cl..................... C07c 51/14, C07c 67/00
[58] Field of Search......................... 260/532, 488 K

[56] References Cited
UNITED STATES PATENTS
2,593,440  4/1952  Hagemeyer......................... 260/532

FOREIGN PATENTS OR APPLICATIONS
713,515  8/1964  Great Britain.................. 260/488 K Primary Examiner—Lorraine A. Weinberger
Assistant Examiner—Richard D. Kelly
Attorney, Agent, or Firm—Kirby L. Boston; Haworth Howard W.

[57]  ABSTRACT

Carboxylic acids and esters thereof are produced by contacting alcohols and carbon monoxide at elevated temperature and pressure in the presence of a catalyst system comprising cobalt, iodide ion and a platinum promoter.

5 Claims, No Drawings

PRODUCTION OF CARBOXYLIC ACIDS AND ESTERS

BACKGROUND OF THE INVENTION

This invention relates to a process for the preparation of carboxylic acids and corresponding esters. More particularly, it relates to an improved liquid phase process for the reaction of alcohols and carbon monoxide in the presence of a catalyst to produce carboxylic acids and corresponding esters.

Carbonylation processes for the preparation of carboxylic acids from alcohols are known in the art and have been directed especially to the production of acetic acid by the carbonylation of methanol. Of the more prominent of these processes are those employing metal carbonyls, such as iron, cobalt and nickel, in conjunction with their halides or other source of halogen ion. See, for example, U.S. Pat. No. 3,014,962 and German Pat. No. 947,469. Of these, cobalt/iodide ion catalyst systems have gained commercial importance.

Cobalt/iodide ion catalyst systems, although more active than the other iron group metal catalysts in carbonylating methanol, nevertheless require high reaction temperatures on the order of 250–300°C in order to produce acceptable yields of acetic acid. At these temperatures extremely high pressures are required in order to stabilize the complex intermediates formed in the course of the carbonylation reaction. Operating pressures from about 3,000 psig to about 10,000 psig are common. As a consequence of such high pressures costlier processing equipment is required.

It would be an advantage to employ a catalyst system which did not require high operating temperatures to be active in carbonylating methanol to acetic acid. Such a catalyst system would be further advantageous in that it would not require high operating pressures.

SUMMARY OF THE INVENTION

It has now been found that an improved process for the carbonylation of aliphatic alcohols to a mixture comprising carboxylic acids and esters of said acids and alcohols comprises contacting the alcohol and carbon monoxide at elevated temperature and pressure in the presence of a platinum-promoted cobalt/iodide catalyst system. The platinum-promoted catalysts are approximately 100 times more active than similar unpromoted catalyst systems and consequently are effective at significantly lower operating temperatures and pressures.

DESCRIPTION OF THE PREFERRED EMBODIMENTS

In accordance with the present invention, alcohols are converted to a mixture enriched in carboxylic acids having one carbon atom more than the alcohol from which it is derived by contacting the mixture in the liquid phase with carbon monoxide at elevated temperature and pressure in the presence of a catalyst system as herein described. Although the reactions are complex and are not known with certainty, the overall reaction may be illustrated by the following equation (I) wherein methanol is selected as exemplary of the alcohol.

$$CH_3OH + CO \xrightarrow{catalyst} CH_3COOH$$

(I)

In such carbonylation reactions as described by the preceding equation, the carboxylic acid product initially formed is also reactive with the unreacted alcohol present and results in the formation of the corresponding ester according to the following equation (II).

$$CH_3COOH + CH_3OH \rightleftarrows CH_3COOCH_3 + H_2O$$

(II)

In that the reaction of the acid with the alcohol (equation II) is faster than the carbonylation reaction (equation I), essentially all of the alcohol initially present will be converted to the ester as sufficient acid is produced. When this point is reached, the alcohol concentration in the reaction system will be the equilibrium concentration as determined by equation (II) under reaction conditions. Normally, such alcohol equilibrium concentrations are quire low and the process of equation (I) in the presence of cobalt/iodide ion catalyst systems is not kinetically favored. However, the platinum-promoted catalyst systems of the instant invention are active at these low alcohol concentrations with the result that the initially formed ester will revert to the acid and alcohol (according to equation II) as the carbonylation reaction continues. There will finally result a mixture comprising a large proportion of the carboxylic acid product.

The Alcohol Reactant. The alcohols which are useful in the process of this invention are the lower aliphatic alcohols, preferably primary or secondary alkanols, having from 1 to 10 carbon atoms such as methanol, ethanol, propanol, the butanols, the hexanols and the like. Especially preferred is methanol. The alcohol reactant may be provided in the form of derivative products of such alcohols, e.g., ethers, alkyl halides or esters, which revert to the alcohol under conditions of the process. For example, where acetic acid is the desired carboxylic acid product, the feedstock may consist of methanol, dimethyl ether, methyl acetate or combinations thereof.

The Catalyst. The catalyst of the instant invention is generally referred to as a platinum-promoted cobalt/iodide ion catalyst. The cobalt constituent of the catalyst can be provided in a variety of forms, preferably in the form of a salt, such as the salt of a lower alkanoic acid having from 2 to 10 carbon atoms, e.g., acetic, propionic or butyric acid and the like. Also useful are cobalt halides, such as cobalt fluoride, cobalt chloride, cobalt bromide and cobalt iodide, and other cobalt salts such as nitrates, sulfates, cyanides, etc. Whenever cobalt is employed as the salt of a lower alkanoic acid, it is preferable to use the salt of the carboxylic acid which will be formed.

The iodide ion constituent of the catalyst system may be provided in the form of free iodine or in the form of an iodine compound. Illustrative iodine compounds include hydrogen iodide (generally in the form of an aqueous solution), alkali metal iodides, and the alkyl iodides derived from lower alcohols containing up to 4 carbon atoms. e.g., methyl iodide. Of course, the cobalt constituent and the iodide constituent may also be provided as a combination, for example in the form of cobalt iodide.

The form in which the platinum constituent of the catalyst systems of the instant invention is provided is not critical. Platinum may be provided in a form which is at least initially insoluble in the reaction medium or it may be provided in a form which is soluble in the reaction medium. Moreover, the platinum is provided either in the form of inorganic or organic compounds and is provided in any of its known oxidation states. platinum is effective as a catalyst promoter in the instant process in its zero-valent, divalent and tetravalent forms. Exemplary platinum compounds include chloroplatinic acid, platinic acid, platinum tetrachloride, ammonium hexachloroplatinate, platinic oxide, platinic disulfide, platinous oxide, platinum dichloride, platinum diiodide, platinum cyanide, platinum hydroxide, platinum sulfide, and metallic platinum.

Platinum is also effective when employed as a complex with certain stabilizing ligands. Although ligands such as olefin, nitroxoyl, phenol, thiophenol and amino are effective ligands, the preferred ligands are trisorgano derivatives of elements of Group Va of the Periodic Table having an atomic number of from 15 to 33, i.e., phosphorus and arsenic, characterized by each valence of the Group Va element being satisfied by a bond to a carbon atom of the organic moiety. Thus, the preferred complexing ligands are phosphines or arsines and are represented by the formula:

$R_3E$ wherein the E is the Group Va element of atomic number from 15 to 33 and R independently is an organo group having from 1 to 20 carbons, preferably 1 to 10, and having only aromatic unsaturation. R is therefore saturated aliphatic, including cycloaliphatic, or is aromatic in character, preferably mononuclear aromatic, and is hydrocarbyl, there is, contains only atoms of carbon and hydrogen, or is substituted hydrocarbyl containing, besides atoms of carbon and hydrogen, other atoms such as oxygen, sulfur, nitrogen ahd halogen, particularly halogen of atomic number from 9 to 35, which atoms are present in functional groups such as alkoxy, carboalkoxy, acyl, trihalomethyl, halo, cyano, dialkylamino, sulfonylalkyl, alkanoyloxy and like groups having no active hydrogen atoms. Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethyl-cyclopentyl, cyclooctyl, benzyl and p-phenylethyl; as well as substituted groups such as 4-bromohexyl, methoxymethyl, 3-diethylamino) propyl, 4-carbethoxybutyl and 2-acetoxyethyl. Aromatic R groups include hydrocarbyl aromatic groups such as phenyl, tolyl, xylyl, p-ethylphenyl, p-tertbutylphenyl, m-octylphenyl, 2,4-diethylphenyl, p-phenylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl 3,5-bis(trichloromethyl)phenyl and 3-dibutylaminophenyl.

In the $R_3E$ ligand as defined above, the R moieties are the same or are different, although ligands wherein all R groups are the same are generally preferred. Exemplary ligands include phosphines such as triethylphosphine, tributylphosphine, triphenylphosphine, tris(4-methoxyphenyl)phosphine, tris(4-tolyl)phosphine, tris-(3-chlorophenyl)phosphine, tris(4-dimethylaminophenyl)phosphine, dibutylstearylphosphine, tribenzylphosphine, cyclohexyldibutylphosphine and the like; and arsines such as triphenylarsine, ditolylphenylarsine, tris(4-ethoxyphenyl)arsine, diphenylcyclohexylarsine, dibutylphenylarsine, and the like. In general, phosphine ligands are preferred over analogous arsine ligands, and ligands wherein the phosphorus substituents are aromatic are generally preferred over wholly aliphatic phosphine ligands. Largely because of economic reasons, triphenylphosphine is a particularly preferred ligand.

Illustrative platinum complexes incorporating the stabilizing ligands as herein described include zero valent coordination complexes as well as coordination complexes with divalent platinum salts. Exemplary platinum complexes include bis(triphenylphosphine) platinum dichloride, bis(triphenylarsine)platinum dibromide, tetrakis(triphenylphosphine)platinum(O), tris(triphenphorsine)platinum(O), bis(triphenylphosphine)platinum(O), bis(triphenylphosphine)platinum-(O)dicarbonyl, and tetrakis(trifluorophosphine)-platinum(O).

The amounts in which the cobalt and iodide constituents of the conventional catalyst systems are employed are not critical, and will generally depend upon the temperature and pressure of the system as well as the alcohol reactant selected. Typically, the cobalt constituent is present in amounts from about 0.1% to about 10% by weight, based upon the alcohol reactant. The iodide ion concentration can vary widely depending upon the form in which it is provided, however, it is generally present in greater amounts than is the cobalt constituent. Amounts of iodine in the form of iodide ion of from about 0.2% to about 20% by weight, based upon the alcohol reactant are typical. In some modifications of the process wherein the iodide constituent is provided in the form of a salt, e.g., cobalt iodide, it has been found advantageous to employ an additional amount of iodide ion in the form of hydrogen iodide, generally supplied as an aqueous solution, or as a lower alkyl iodide, e.g., methyl iodide. The amount of additional hydrogen iodide added is not critical and when employed is typically present in amounts of from about 10 % to 200% by weight based on the amount of iodide salt present.

The amount of platinum promoter required to produce an effective catalyst is not critical. Platinum in amounts from about 0.1% to about 10%, by weight based upon the amount of cobalt are satisfactory, with amounts of from about 0.2% to about 5% by weight being preferred.

The Process Conditions

In the carbonylation process of the instant invention, one mole of carbon monoxide will be consumed for each mole of carboxylic acid and/or ester produced. However it is advantageous to employ an excess of carbon monoxide in the reaction environment. Amounts of carbon monoxide of 10 moles per mole of alcohol reactant are typical, and even greater quantities may be employed if desired. The carbon monoxide is generally of standard commercial quality and may contain inert impurities such as hydrogen, carbon dioxide, methane, nitrogen, noble gases, water and paraffinic hydrocarbons having from 1 to 4 carbon atoms in small quantities. When such impurities are present the total reactor pressure will have to be increased to maintain the desired carbon monoxide pressure as a carbon monoxide partial pressure.

It has been found that water generally exerts a beneficial effect on the rate of the reaction. As the alcohol is carbonylated to the carboxylic acid, the acid thereby formed will react with the alcohol to form the corresponding ester and water. Consequently, there will result an equilibrium mixture wherein the predominant constituent is the ester of the alcohol and the initially formed acid. In the resulting mixture the carboxylic acid is thereafter formed by reaction of carbon monoxide with the small amount of alcohol which exists in equilibrium with the ester. As that alcohol is carbonylated to the carboxylic acid, the ester will undergo hydrolysis in order to maintain the equilibrium concentration of alcohol. By this process the carboxylic acid is ultimately produced in significant concentration. Adding water to the feed mixture enhances the hydrolysis reaction and therefore accelerates the rate at which the carboxylic acid is concentrated in the reaction products. Quantities of water of up to about 100% by weight of the alcohol reactant are generally satisfactory in promoting the overall reaction, with water concentrations of from about 5% to about 50% by weight based on the alcohol reactant being preferred.

In that the platinum-promoted cobalt/iodide catalysts of the present invention are characterized by an unusually high activity, it is possible to operate the process at lower temperatures and, consequently, at significantly lower operating pressures. Operating temperatures of from about 50°C to about 250°C are typical with preferred temperatures being from about 100°C to about 200°C. Carbon monoxide pressures of the order of from about 500 psig to about 5,000 psig are employed; however, carbon monoxide pressures of from about 1,000 psig to about 4,000 psig are generally preferred.

The process of the instant invention is conducted by any of a variety of procedures. In one modification, the alcohol reactant, catalyst, water and carbon monoxide are charged to an autoclave or similar pressure reactor for operations in a batchwise manner. In another modification, reaction is effected in a continuous operation as by contacting the entire reaction mixture during passage through a tubular reactor. It is equivalently useful to add portions of the carbon monoxide continuously throughout the period of the reaction.

Subsequent to reaction, the reaction mixture is separated by conventional means, such as distillation, selective extraction and the like. The carboxylic acid product can be further purified, as for example, by distillation. The derivative products such as ethers, esters and unreacted alcohol, can be recycled and further reacted by the process of this invention, as can be the recovered catalyst components.

Carboxylic acids produced by the process of this invention, e.g., acetic acid, are chemicals of commercial importance used in producing polymerizable esters, such as vinyl acetate and cellulose acetate, which are of importance in the polymer and fiber industries.

The following Illustrative Embodiments are presented to describe the invention more fully without any intention of being limited to the details thereof.

Illustrative Embodiment I

A. Into a 50 ml Hastelloy B reaction vessel were added 0.1 g cobalt iodide, 2.0 g methanol. 0.1 g 55% hydriodic acid and 0.0014 g chloroplatinic acid ($H_2PtCl_6$) as promoter. The reaction vessel was sealed, pressured to 1000 psig with carbon monoxide and maintained at 150°C for 18 hours. At the end of this period the reactor was vented and the reaction products analyzed by GLC. The liquid products recovered weighed 2.62 g and analyzed 70.5 wt. % methyl acetate and 23.2 wt. % acetic acid.

B. For comparative purposes the above procedure was repeated except that no platinum promoter was employed. The liquid products recovered weighed 1.81 g and analyzed 40 wt % methyl acetate and 0 wt. % acetic acid.

Illustrative Embodiment II

The procedure of Illustrative Embodiment I was repeated except that various other metal compounds were used in place of the platinum compound. The results are presented in the following Table I.

TABLE I

| Promoter | Amount, g. | Liquid Products, g. | Acetic Acid, wt.% | Methyl Acetate wt.% |
|---|---|---|---|---|
| None | — | 1.81 | 0 | 40.0 |
| $RhCl_3$ | 0.0010 | 1.69 | 0 | 30.0 |
| $RuCl_3$ | 0.0010 | 2.07 | 0 | 74.5 |
| $PdCl_2$ | 0.0006 | 2.10 | 0 | 66.1 |
| $[(C_6H_5)_3P]_4Pd(0)$ | 0.0040 | 2.02 | 0 | 57.5 |
| $OsCl_3$ | 0.0010 | 1.98 | 0 | 47.0 |
| $HAuCl_4$ | 0.0100 | 1.83 | 0 | 40.0 |
| $CeCl_3$ | 0.0020 | 1.92 | 0 | 39.8 |
| $NH_4ReO_4$ | 0.0010 | 1.80 | 0 | 34.6 |
| $WCl_6$ | 0.0020 | 1.80 | 0 | 34.1 |
| $TiCl_4$ | 0.0010 | 1.57 | 0 | 32.6 |

The above data of Illustrative Embodiments I and II demonstrate that of all the metals tested only platinum was active in producing acetic acid under the process condition described herein. As measured by methyl acetate formation, some promotional effect is exhibited by palladium, ruthenium and osmium; however, these metals do not result in a significant yield of acetic acid under these conditions.

Illustrative Embodiment III

Platinum in a variety of chemical combinations is effective as a catalyst promoter in the instant process. This was demonstrated in a series of experiments conducted according to the procedure of Illustrative Embodiment I wherein different platinum compounds were evaluated. The data are presented in the following Table II.

TABLE II

| Platinum Compound | Amount | CO Pressure psig | Liquid Products | Acetic Acid wt. % | Methyl Acetate wt. % |
|---|---|---|---|---|---|
| $H_2PtCl_6$ | 0.0014 | 1000 | 2.62 | 23.2 | 70.5 |
| $[(C_6H_5)_3P]_4Pt(0)$ | 0.0043 | 1000 | 2.67 | 22.2 | 70.5 |
| $Pt(CN)_2$ | 0.0004 | 2000 | 2.74 | 42.0 | 54.0 |
| PtO | 0.0003 | 2000 | 2.79 | 41.7 | 52.5 |
| $H_2PtCl_4$ | 0.0006 | 2000 | 2.88 | 39.0 | 45.0 |

From the above data it is apparent that platinum provided in both soluble and insoluble form is effective in promoting the formation of acetic acid by the instant process. Moreover, platinum in any of its known valence states and in the form of either inorganic and organic compounds is equivalently effective in the instant process.

Illustrative Embodiment IV

In the reaction of methanol and carbon monoxide to form acetic acid, high carbon monoxide pressures are generally required in order to obtain a satisfactory yield of acetic acid. The higher the carbon monoxide pressure, the higher is the yield of acetic acid. However, the high activity of the platinum promoted catalyst systems of the instant invention make it possible to produce acetic acid at carbon monoxide pressures at which conventional catalysts would be inactive. This greater activity is demonstrated in a series of experiments conducted according to the procedure of Illustrative Embodiment I, and the data from these experiments are presented in the following Table III.

TABLE III

| Promoter | Amount g. | CO Pressure psig | Liquid Products g. | Acetic Acid wt. % | Methyl Acetate wt. % |
|---|---|---|---|---|---|
| None | — | 1000 | 1.81 | 0 | 40.0 |
| None | — | 2000 | N.D.* | 3 | 40.0 |
| H$_2$PtCl$_6$ | 0.0006 | 1000 | 2.52 | 18.1 | 78.4 |

*N.D. - Not determined

From the above data it is apparent that while the conventional cobalt/iodide catalyst system is inactive at 1,000 psig for acetic acid production, the platinum promoted catalyst system exhibits high activity for the carbonylation of methanol to acetic acid.

Illustrative Embodiment V

The amount of platinum promoter required to maintain a high activity for acetic acid production is not critical and can vary widely. The following data were obtained in a series of runs according to the procedure of Illustrative Embodiment I wherein the amount of chloroplatinic acid promoter was varied.

TABLE IV

| Chloroplatinic Acid g. | Platinum/ Cobalt Ratio by Weight | Liquid Product Recovered g. | Acetic Acid wt. % | Methyl Acetate wt. % |
|---|---|---|---|---|
| None | — | 1.81 | 0 | 40.0 |
| 0.0002 | 1:200 | 2.30 | 19.1 | 78.7 |
| 0.0006 | 3:200 | 2.52 | 18.1 | 78.4 |
| 0.0014 | 7:200 | 2.62 | 23.2 | 70.5 |

Illustrative Embodiment VI

A mixture of 2.0 g. methanol, 0.1 g. cobalt iodide, 0.0006 of chloroplatinic acid and 0.006g. of methyl iodide were contacted with carbon monoxide under the conditions set forth in Illustrative Embodiment I. The liquid reaction products recovered weighed 2.71 g. and analyzed 78.0 wt. % methyl acetate and 17.0 wt. % acetic acid.

Illustrative Embodiment VII

A mixture of 2.0 g. methanol, 0.1 g. cobalt iodide, 0.0006g. of chloroplatinic acid, 0.1 g. 55% hydriodic acid, and 0.2 g. water were contacted with carbon monoxide at 2000 psig. Otherwise the test conditions were the same as in Illustrative Embodiment I. The liquid reaction products recovered weighed 3.24 g. and analyzed 27 wt. % methyl acetate and 57 wt. % acetic acid.

Illustrative Embodiment VIII

A mixture of 13.9 g. methyl acetate, 5.8 g. water, 0.1 g. cobalt iodide, 0.1 g. 55% hydriodic acid and 0.0014 g. chloroplatinic acid were contacted with carbon monoxide at 2,500 psig at a temperature of 184°C in the reactor described in Illustative Embodiment I. After 1.1 hours the liquid reaction products were recovered. The liquid products weighed 21.7g and analyzed 20 wt. % methyl acetate, 56 wt. % acetic acid, 18 wt. % water, 2 wt. % methanol and 4 wt. % acetaldehyde.

Illustrative Embodiment IX

A mixture of 12.0 g. methanol, 2.4 g. water, 0.96 g. cobalt acetate, 3.0 g. 55% hydriodic acid and 0.0072 g. chloroplatinic acid were charged to a 300 ml Hastelloy B reactor and pressured to 2,500 psig with carbon monoxide. After 1 hour at 204°C, during which the average reactor pressure was 2,800 psig, the reactor was vented and the liquid products recovered. The liquid products weighed 20.7 g. and analyzed 21 wt. % methyl acetate, 53 wt. % acetic acid, 18 wt. % water, 3 wt. % methanol and 4 wt. % acetaldehyde.

Illustrative Embodiment X

A mixture of 10.0 g. ethanol, 2.4 g. water, 1.2 g. cobalt iodide, 1.2 g. 55% hydriodic acid and 0.0072g. of chloroplatinic acid were contacted with carbon monoxide under conditions as set forth in Illustrative Embodiment IX for a period of 6 hours. The liquid products recovered weighed 15.0 g. The liquid products contained about equal amounts of diethylether and ethylpropionate and trace amounts of propionic acid. There was also present in the liquid products about 8 wt. % ethanol.

Illustrative Embodiment XI

A mixture of 10.0 g. n-heptanol, 2.4 g. water, 1.2 g. cobalt iodide, 1.2 g. 55% hydriodic acid and 0.0072 g. chloroplatinic acid were contacted with carbon monoxide under conditions as set forth in Illustrative Embodiment IX for a period of 6 hours. The liquid products recovered weighed 9.7 g. The major products were heptene, octanoic acid, heptyl octoate, heptyl ether and heptyl iodide. There were also several unknown products.

Illustrative Embodiment XII

The procedure of Illustrative Embodiment XI was repeated except that 12 g. of t-butanol were used in place of n-heptanol. After 6 hours at 204°C 11.7 g. of liquid products were recovered. The major product was t-butylpivalate. A moderate amount of pivalic acid and some isobutylene were also formed.

I claim as my invention:

1. In the process for the production of carboxylic acids by contacting an alcohol having from 1 to 10 carbon atoms with carbon monoxide at a temperature of from about 50°C to about 250°C and at a pressure of from about 500 psig to about 5,000 psig in the presence of up to about 100% by weight water based on the weight of alcohol and a catalyst consisting essentially of cobalt and iodide ion constituents, the improvement consisting essentially of adding a platinum catalyst promoter selected from the group consisting of platinum, platinum salts, haloplatinic acids, platinum oxides and platinum complexes where the stabilizing ligand is represented by the formula:

wherein E is phosphorus or arsenic and R independently is a monovalent organic moiety of from 1 to 20 carbon atoms, is free from aliphatic carbon-carbon unsaturation, is bonded to said E atom by a carbon-E bond and is selected from unsubstituted saturated aliphatic, unsubstituted phenyl, monosubstituted saturated aliphatic and monosubstituted phenyl wherein said substituent is free from aliphatic carbon-carbon unsaturation and is selected from alkoxy, carbalkoxy, trihalomethyl, halo, dialkylamino, alkanoyloxy and phenyl, said catalyst promotor being added in an amount from about 0.1% to 10% by weight of platinum based on the amount of cobalt in the catalyst.

2. The process of claim 1 wherein the platinum catalyst promoter is chloroplatinic acid.

3. The process of claim 1 wherein the platinum catalyst promoter is a platinum salt selected from the group consisting of cyanides, halides, hydroxides, sulfides and lower alkanoic said salts wherein the acid moiety has from 2 to 10 carbon atoms.

4. The process of claim 1 wherein the reaction is carried out in the additional presence of water in an amount of from 5% to 50% by weight, based on the alcohol reactant.

5. The process of claim 1 wherein the alcohol is methanol.

* * * * *